United States Patent [19]

Edwards

[11] Patent Number: 5,761,084
[45] Date of Patent: Jun. 2, 1998

[54] HIGHLY PROGRAMMABLE BACKUP POWER SCHEME

[75] Inventor: Michael S. Edwards, San Jose, Calif.

[73] Assignee: Bay Networks, Inc., Santa Clara, Calif.

[21] Appl. No.: 688,807

[22] Filed: Jul. 31, 1996

[51] Int. Cl.⁶ .................. G06F 3/00; H02J 3/14
[52] U.S. Cl. .................. 364/492; 364/481; 364/483; 307/23; 307/29; 307/43; 323/284; 395/750.01
[58] Field of Search .................. 396/278; 307/80, 307/64, 66, 43–46, 149, 150, 85–87, 48, 82; 365/229, 228; 395/182.2, 181, 182.13, 750.01; 320/5, 2, 14, 15, 30, 39; 322/10, 11; 327/1, 50, 63, 530; 363/13, 39, 40, 41, 65; 364/481, 483

[56] References Cited

U.S. PATENT DOCUMENTS

| | | | |
|---|---|---|---|
| 3,614,566 | 10/1971 | Konig | 318/762 |
| 4,007,472 | 2/1977 | Land | 429/153 |
| 4,335,445 | 6/1982 | Nercessian | 364/483 |
| 4,677,311 | 6/1987 | Morita | 307/66 |
| 5,087,872 | 2/1992 | Gupta | 323/340 |
| 5,266,838 | 11/1993 | Gerner | 307/82 |
| 5,339,446 | 8/1994 | Yamasaki et al. | 395/750 |
| 5,390,188 | 2/1995 | Dawson | 371/20.6 |
| 5,420,493 | 5/1995 | Hargadon et al. | 320/15 |
| 5,532,524 | 7/1996 | Townsley et al. | 307/64 |
| 5,548,206 | 8/1996 | Soo | 323/284 |
| 5,567,993 | 10/1996 | Jones et al. | 307/43 |

*Primary Examiner*—Emanuel T. Voeltz
*Assistant Examiner*—Cuong H. Nguyen
*Attorney, Agent, or Firm*—Blakely, Sokoloff, Taylor & Zafman LLP

[57] ABSTRACT

Heavily relied upon network devices require backup power systems. To efficiently allocate power, a highly programmable backup power system is desired. The present invention discloses a redundant power supply unit that provides backup power to network devices. The redundant power supply unit will supply power to the network devices in the case that their local internal power supplies fail. Furthermore, if there is a power outage from the utility company, the redundant power supply will supply power to the network devices from a internal battery pack. When the internal battery pack is engaged, the redundant power supply uses programmed control logic that controls how the power from internal battery pack will be allocated. Specifically, since the power from the batteries is limited, it can be used to power some network devices for a certain amount of time and other network devices for a longer amount of time. Furthermore, the power from the batteries can be allocated depending on the voltage level of the battery thus, when the battery voltage drops below a certain threshold the power supply may disconnect power to some units and maintain power to others.

12 Claims, 2 Drawing Sheets

1

HIGHLY PROGRAMMABLE BACKUP POWER SCHEME

FIELD OF THE INVENTION

The present invention relates to the field of power supplies. In particular, the present invention discloses a programmable backup power system that allows a user to program how the backup power will be used once a power failure has been detected.

BACKGROUND OF THE INVENTION

Modern companies are relying more and more on their computer networks for their day to day operations. It is therefore, essential for the computer networks to be operational all of the time. A power failure can quickly bring down a computer network since all the network hubs and gateway require power to function. To ensure reliable network operation, most companies use uninterruptable power supplies (UPS) to protect their computer network equipment from failing during a power failure.

An uninterruptable power supply (UPS) is a device that is placed between an AC power source from utility company and a network device that is to be powered. Within the uninterruptable power supplies is a battery that is continually charged by the AC power from the utility company. Once the uninterruptable power supply senses a loss of power from the utility company, the uninterruptable power supply starts providing power from the battery to the network computer device.

Not all the elements that construct a computer network are equally important. For example, the routers and switches that control the backbone of a computer network are more important than peripheral devices connected to the network such as printers and remote access servers. Thus, when a power outage occurs it would be desirable to supply power to the most important parts of the computer network for as long as possible. Therefore, since the UPS batteries have limited hold up time, the less important parts of the network may be powered for a limited time such that they may shut down to reserve battery power for the more important parts of the network. For example, a backup power supply that supplies power to an unimportant local area network may only supply power for a limited time to allow the nodes on that local area network to shut down. However, the backup power supply should supply power to a wide area network switch that couples other outside offices. Ideally, the backup power supply will supply power until the connections from outside offices are rerouted to avoid the power failure.

SUMMARY OF THE INVENTION

The present invention discloses a highly programmable backup power system. The present invention is implemented within a redundant power supply unit that provides backup power to network devices. The redundant power supply unit will supply power to the network devices in the case that their local internal power supplies fail. Furthermore, if there is a power outage from the utility company, the redundant power supply will supply power to the network devices from a internal battery pack. When the internal battery pack is engaged, the redundant power supply uses programmed control logic that controls how the power from internal battery pack will be allocated. Specifically, since the power from the batteries is limited, it can be used to power some network devices for a certain amount of time and other network devices for a longer amount of time. Furthermore, the power from the batteries can be allocated depending on the voltage level of the battery thus, when the battery voltage drops below a certain threshold the power supply may disconnect power to some units and maintain power to others.

DETAILED DESCRIPTION OF THE INVENTION

Figure 1:
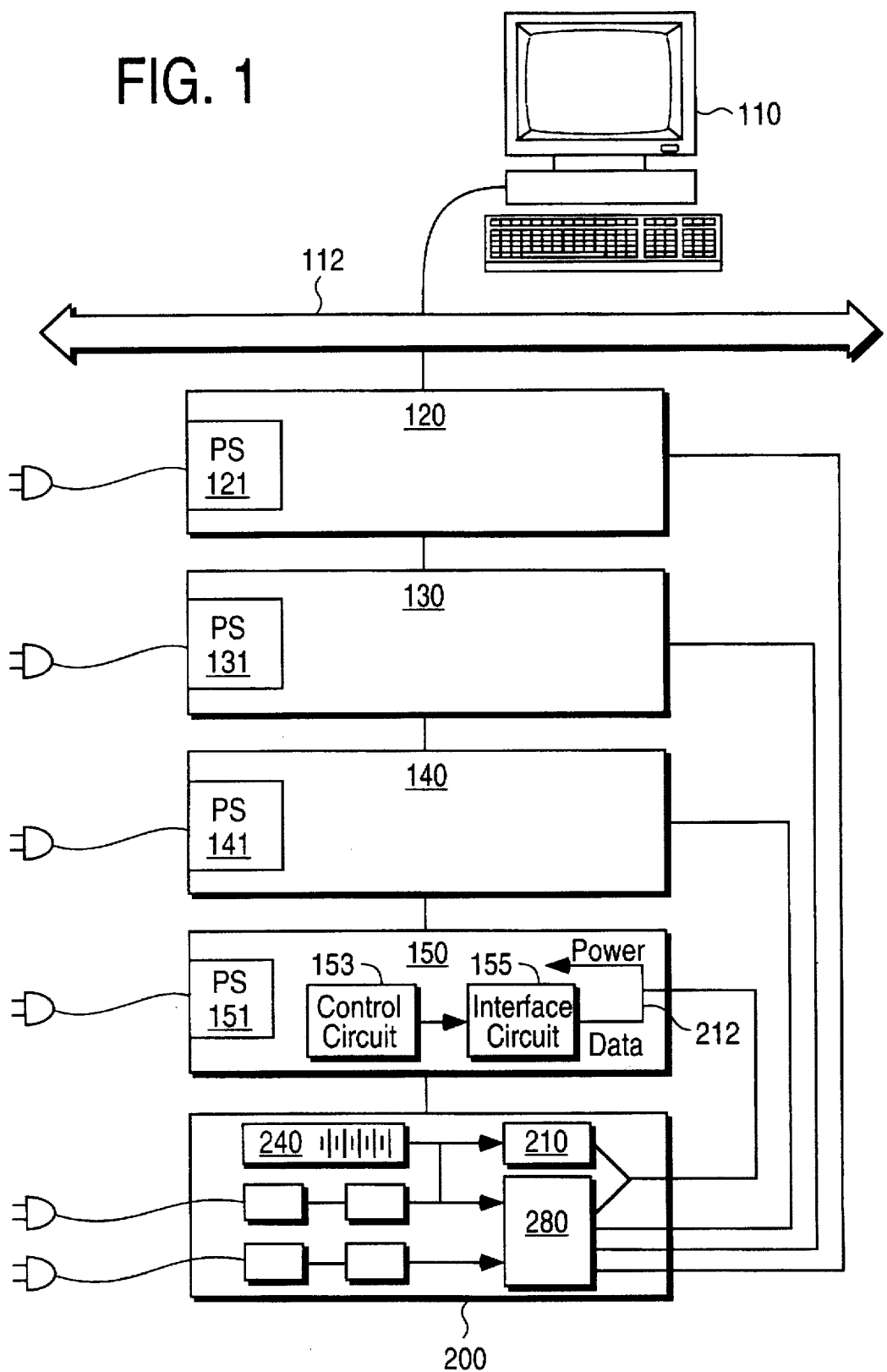
FIG. 1 illustrates the redundant power supply of the present invention powering for network devices connected to a computer network.

FIG. 1 illustrates four network devices (120, 130, 140 and 150) powered by the redundant power supply 200 of the present invention. The network devices 120, 130, 140, and 150 are used to implement various functions for the computer network 112. For example, the network devices 120, 130, 140, and 150 may comprise switches, hubs, gateways, routers, remote access servers, or other devices used to construct a computer network.

Also coupled to the computer network 112 is a network management workstation 110. The network management workstation 110 is used to control various network devices connected to the computer network 112 using a network management protocol. In the present embodiment, the network management workstation 110 communicates with the network devices using the well-known simple network management protocol (SNMP).

As illustrated in FIG. 1 each network device 120, 130, 140, and 150 has its own internal power supply (121, 131, 141, and 151) to power the network device. However, power supplies may eventually fail and require replacement. To prevent the computer network from being affected by a power supply failure, each of the network devices 120, 130, 140, and 150 are also powered by the redundant power supply 200. If the internal power supply (121, 131, 141, or 151) of one of the networks devices fails, the respective network device (120, 130, 140, or 150) will then receive power from the redundant power supply 200 in order to continue functioning. Furthermore, the network device with a failed power supply will alert the network management station 110 that its power supply has failed such that the failed power supply may be replaced.

As illustrated in FIG. 1 redundant power supply 200 also includes a backup battery 240. If the alternating current (AC) power from the utility company is cut off then the redundant power supply 200 begins powering all the network units 120, 130, 140, and 150 using the battery 240.

Figure 2:
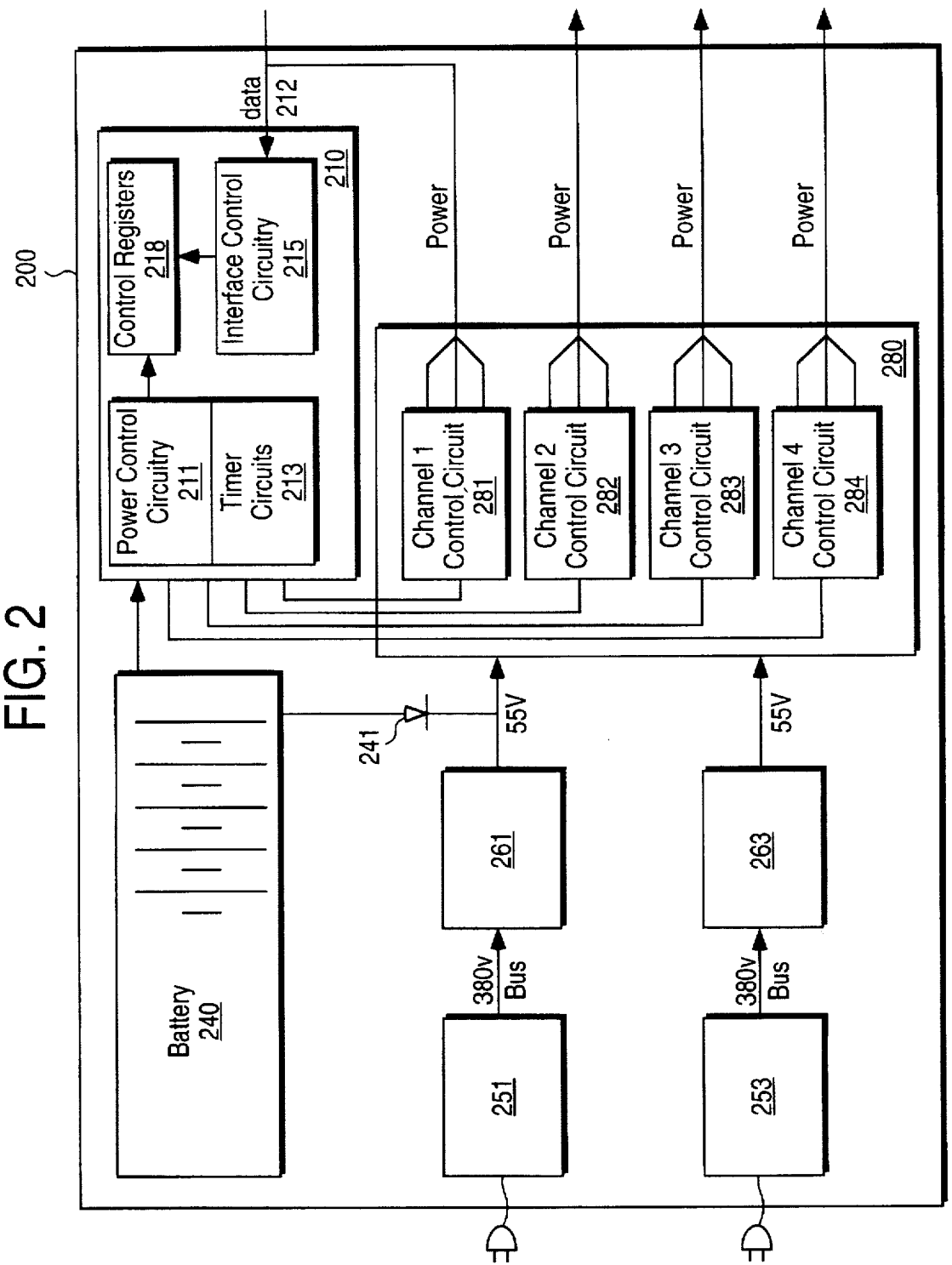
FIG. 2 illustrates a block diagram of the internal features of the redundant power supply of the present invention.

FIG. 2 illustrates an internal diagram of the redundant power supply 200. As illustrated in FIG. 2 there are two parallel AC to DC transforming paths such that the redundant power supply is redundant within itself. A first power supply path comprises a connection to a utility company AC line to transformer 251 that generates a 380 volt Direct Current (DC) Bus. The 380 volt DC Bus is then regulated down to 55 Volts DC by high voltage bus circuit 261. The second power supply path consists of transformer 253 that transforms the utility company AC power into a 380 volt DC Bus. The 380 volt DC Bus is then regulated down to a 55 volt DC power source by high voltage bus circuit 263.

The 55 volts of DC power from high voltage bus circuit 261 and 263 supply a power distribution network 280 that divides the power among a number of power circuit channels. In the embodiment depicted in FIG. 2, there are four channels of power output wherein each channel delivers a +5 volt, +12 volt, and −12 volt power sources. Each power channel is controlled by individual control circuitry 281, 282, 283, and 284.

Also illustrated in FIG. 2 is an internal back-up battery 240. The back-up battery 240 is a 48 volt battery. Back-up battery 240 is charged by the 55 volt DC power from circuit 261. When there is a power failure such that the voltage produced by circuit 261 drops below the battery threshold voltage, then the back-up battery 240 will begin providing power to the power distribution network 280.

To control redundant power supply 200 during a power failure, there is a control circuitry section 210. The control circuitry 210 receives programming information through a data line 212. The data line is handled by interface circuitry 215. The data line may be a serial line thus, the interface circuitry 215 would be a serial line control circuitry. The control circuitry 210 controls the 4 individual channel control circuits 281, 282, 283, and 284. Each channel control circuit can individually be turned on or off. Thus, the control circuitry 210 can decide which channels will receive power.

The data received over the data line 212 is used to program a set of control registers 218. The control registers 218 define a set of parameters that will control how the redundant power supply 200 operates during a power failure. Specifically, the control registers 218 define exactly how the redundant power supply 200 will allocate power from the internal battery 240 to the four different network devices.

In the present embodiment, there is one register for each power channel. The register for each power channel stores a "hold-up" time that defines how long the control circuitry 210 will provide to that power channel. A reserved value will be used to indicate that the control circuitry 210 should hold that power channel until the battery is discharged. When a power failure occurs, the control circuitry 210 sets each of the timer circuits 213 with the holdup times from the control registers 218 (except for registers that contain the reserved value designated for infinite hold-up). As each timer circuit pops, its corresponding power channel is turned off using its channel control circuit (281, 282, 283, or 284). Eventually, only the power channels designated for infinite hold-up will receive power.

In an alternate embodiment, the control register values define a "switchout voltage threshold." The switchout voltage threshold defines a battery voltage level at what a power channel will be cut off from battery power. Thus, when a power outage occurs the power control circuitry 211 provides power to all the power channels. The power control circuitry 211 then constantly monitors the voltage level of the battery 240. When the power control circuitry 211 detects that the battery 240 voltage level equals the switchout voltage threshold for a particular power channel, then the power control circuitry 211 switches off the power for that power channel using its channel control circuit (281, 282, 283, or 284). If the switchout voltage threshold for a power channel is set to zero, then that power channel will receive power until the battery is discharged.

To illustrate how the present invention can be used in a complex network, an example usage of the first embodiment will be provided with reference to FIG. 1. As illustrated in FIG. 1, the redundant power supply 200 provides back-up power to four networks units. For purposes of example, network device 120 is an unimportant network device, network device 130 is a hub for a user LAN, network device 140 is a hub for a server LAN, and network device 150 is a switch for the corporate backbone.

In this embodiment power channel for network device 120 may be programmed for 4 minutes of battery holdup such that the users can quit their applications and log off the network and the power channel for network device 120 may programmed to 5 minutes of battery holdup such that the servers may automatically shut-down. The power channel for unimportant network device 120 programmed for no holdup and thus conserve battery power for more important usage. Finally, the power channel for corporate backbone switch may be programmed to be held up by batteries until complete battery discharge state is reached. It should be apparent that this invention allows the user to program a backup power holdup priority, for a complex multiple node system, with a single backup energy storage device and power routing hardware and software.

Referring now to FIG. 2, the data line 212 is grouped together with one of the power supply lines that supplies power to one of the network devices. Thus, one of the network devices is used to program the redundant power supply 200. Referring back to FIG. 1, network device 150 is used to program the redundant power supply 200. Network device 150 is a controllable network device that is controlled by control circuit 153.

Control circuit 153 of network device 150 is controlled remotely by the network management workstation 110 connected to the network 112. The network management workstation 110 controls network device 150 sending packets encoded in the simple network management protocol (SNMP). To control the redundant power supply 200, the network management device network management workstation 110 sends special SNMP control commands to the control circuit 153 of network device 150. These special control commands are interpreted by the control circuit 153 as redundant power supply programming commands.

To pass the programming commands along to the redundant power supply 200, the control circuit 153 uses interface circuit 155 to send the control commands through data line 212 to the control circuit 210 in the redundant power supply. Referring again to FIG. 2, interface circuitry 215 receives and interprets the control commands such that interface circuitry 215 sets the control registers 218 properly.

The foregoing has described methods and apparatus for implementing a programmable power supply. It is contemplated that changes and modifications may be made by one of ordinary skill in the art, to the materials and arrangements of elements of the present invention without departing from the scope of the invention.

We claim:

1. A power supply apparatus, said power supply apparatus comprising:

a network device, said network device coupled to a computer network, said network device controlled by receiving management commands across said computer network;

a battery;

a power distribution network coupled to said battery, said power distribution network comprising at least two power channels, each of said power channels providing power to an external device, one of said external devices comprising said network device, each of said power channels having a channel control circuit; and a programmable power control circuit coupled to said channel control circuits of said power distribution network, said programmable power control circuit controlling said channel control circuits, said programmable power control circuit coupled to said network device for receiving control commands through said computer network.

2. The power supply apparatus as claimed in claim 1 wherein said programmable power control circuit is controlled by sending SNMP commands to said network device.

3. The power supply apparatus as claimed in claim 1 further comprising:

a transformer circuit, said transformer circuit for transforming AC line current into DC current for charging said battery.

4. The power supply apparatus as claimed in claim 1 wherein said programmable power control circuit further comprises:

a set of programmable control registers, said programmable control registers for storing power control parameters;

a set of timer circuits for performing timing operations; and control logic coupled to said timer circuits and said programmable control registers, said control logic accessing power control parameters, said control logic setting said timer circuits.

5. The power supply apparatus as claimed in claim 4 wherein said programmable power control circuit is controlled by sending SNMP commands to said network device.

6. The power supply apparatus as claimed in claim 4 wherein said programmable control registers store hold-up times, said hold-up times defining how long said programmable power control circuit should provide power to each of said power channels.

7. The power supply apparatus as claimed in claim 1 wherein said programmable power control circuit further comprises:

a set of programmable control registers, said programmable control registers for storing power control parameters;

a battery voltage level sensor; and control logic coupled to said timer circuits and said programmable control registers, said control logic accessing power control parameters, said control logic setting said timer circuits.

8. The power supply apparatus as claimed in claim 7 wherein said programmable control registers store switchout voltage thresholds, said switchout voltage thresholds defining a voltage level when said programmable power control circuit should switch off power to each of said power channels.

9. A method of supplying power to at least one network device, said method comprising the steps of:

supplying power from a battery to a power distribution network in a power supply device, said power distribution network comprising controllable power channels for supplying power to said network devices;

receiving control commands from a computer network in said network device;

programming a set of control registers in said power supply device in response to said control commands, said control registers defining a power allocation policy; and distributing power from said battery in said power supply device to said network devices according to said power allocation policy if a power failure occurs.

10. The method of supplying power to at least one network device as claimed in claim 9 wherein said step of programming a set of control registers comprises the steps of:

sending network management control packets to said network device; and interpreting said network management control packets as power allocation policy commands; and setting said control registers according to said power allocation commands.

11. The method of supplying power to at least one network device as claimed in claim 9, said method further comprising the steps of:

programming a hold-up time into a first control register of said set of control registers; and supplying power from said battery to a first power channel associated with said first control register when a power failure occurs for a time specified by said hold-up time.

12. The method of supplying power to at least one network device as claimed in claim 9, said method further comprising the steps of:

programming a switchout voltage threshold into a first control register of said set of control registers; and supplying power from said battery to a first power channel associated with said first control register when a power failure occurs until said battery reaches said switchout voltage threshold.

* * * * *